United States Patent
Sagawa et al.

[11] Patent Number: 6,125,886
[45] Date of Patent: Oct. 3, 2000

[54] PILOT VALVE

[75] Inventors: Toyoaki Sagawa, Kobe; Koji Sakashita, Kakogawa; Yoshio Togashi; Kazuto Fujiyama, both of Kobe, all of Japan

[73] Assignee: Kawasaki Jukogyo Kabushiki Kaisha, Kobe, Japan

[21] Appl. No.: 09/195,214

[22] Filed: Nov. 18, 1998

[51] Int. Cl.[7] ............................. F15B 13/02; F16K 31/48
[52] U.S. Cl. .............................. 137/625.69; 137/596.1; 137/636.1; 251/50
[58] Field of Search .................... 137/596.1, 625.69, 137/636.1, 636.2; 251/50

[56] References Cited

U.S. PATENT DOCUMENTS 5,251,660  10/1993  Hori et al. ........................... 137/636.1

FOREIGN PATENT DOCUMENTS

| 227046 | 4/1963 | Austria . |
| 1259159 | 1/1968 | Germany . |
| 51-79023 | 7/1976 | Japan . |
| 53-68437 | 6/1978 | Japan . |
| 59-164478 | 9/1984 | Japan . |
| 62-15662 U | 1/1987 | Japan . |
| 3-39602 U | 4/1991 | Japan . |

OTHER PUBLICATIONS

Patent Abstracts of Japan, Publication No. 10246342, Sep. 14, 1998.

*Primary Examiner*—Gerald A. Michalsky
*Attorney, Agent, or Firm*—Oliff & Berridge, PLC

[57] ABSTRACT

In order to obtain great damper effects with a comparatively simple structure and fully control a hunting phenomenon, a pilot valve comprises push rods attached to a valve body, spools attached to spools holes of the valve body, spring bearing members provided in spring chambers of the valve body, first spring members provided between the valve body and the spring bearing members, second spring members provided between the spring bearing members and the spools, and an operation level for pressing the push rods. A fluid chamber is provided on an outside of one of ends of each of the spool holes. The fluid chamber communicates with a drain passage through a throttle passage having a throttle portion.

4 Claims, 4 Drawing Sheets

PILOT VALVE

FIELD OF THE INVENTION

The present invention relates to a pilot valve to be used for controlling actuation of hydraulic equipment such as a directional control valve, a regulator and other valves of a variable displacement pump, a hydraulic actuation type clutch and the like.

BACKGROUND OF THE INVENTION

For example, Japanese Non-examined Utility Model Publication No. Sho 62-15662 (Japanese Examined Utility Model Publication No. Hei 4-14645) has disclosed, as a pilot valve to be used for controlling actuation of hydraulic equipment, a pilot valve comprising a valve body, a push rod movably attached to the valve body, and a spool movably attached to a spool hole of the valve body. The valve body is provided with a spring chamber. First and second spring members are provided in the spring chamber. A spring bearing member is relatively movably attached to the spool. The first spring member is provided between the valve body and the spring bearing member to elastically bias the push rod upward through the spring bearing member. The second spring member is provided between the spring bearing member and the spool to elastically bias the spool in a direction apart from the push rod. The valve body is further provided with an operation lever. When the operation lever is turned, the push rod is pressed against elastic force of the first spring member. The spool has first and second spool portions which are provided at a constant interval in an axial direction. A notch is provided between the first and second spool portions. An outside diameter of the first spool portion is a little smaller than that of the second spool portion. A pressure receiving area of a pressure receiving part of the first spool portion is set smaller than that of a pressure receiving part of the second spool portion.

In such a pilot valve, a control lever is held in a neutral position when the operation lever is not manipulated. When the control lever is set in the neutral position, the push rod is held in a projecting position by action of the first spring member, and the spool is held in a non-working position by action of the second spring member. Consequently, the first spool portion of the spool blocks communication of a primary pressure side passage with a secondary pressure side passage, while the notch of the spool causes the secondary pressure side passage to communicate with a tank passage so that a fluid in the secondary pressure side passage flows into the tank passage. When the operation lever is turned to press the push rod in such a state, the spool is moved downward by the action of the second spring member and the notch of the spool causes the primary pressure side passage to communicate with the secondary pressure side passage so that a pressure fluid is fed from the primary pressure side passage to the secondary pressure side passage; The pressure fluid flowing in the secondary pressure side passage acts on the pressure receiving parts of the first and second spool portions so that the spool is biased upward depending on a pressure difference acting on the pressure receiving parts. Thus, the spool is held in a position where the elastic force generated by the second spring member is balanced with the pressure generated by the pressure fluid in the secondary pressure side passage the pressure generated by the pressure fluid depending on a difference in a pressure receiving area).

However, such a pilot valve has the following problems to be solved. More specifically, when the operation lever is manipulated to move the spool from a non-working position, the pressure fluid flows from the primary pressure side passage to the secondary pressure side passage. At this time, if the spool is moved downward to feed the pressure fluid from the primary pressure side passage to the secondary pressure side passage, the pressure of the secondary pressure side passage is raised. Consequently, the spool is about to be moved upward against elastic force of the second spring member. When the spool is thus moved somewhat upward, a part of the fluid in the secondary pressure side passage flows in a tank line so that the pressure of the secondary pressure side passage is dropped. Consequently, the spool is moved downward by means of the second spring member, and the pressure of the secondary pressure side passage is raised again by the pressure fluid flowing from the primary pressure side passage. In such a control state, the spool of the pilot valve easily causes a vibration phenomenon, that is, a so-called hunting phenomenon so that actuation of the pilot valve becomes unstable.

In order to prevent such a hunting phenomenon, Japanese Non-examined Utility Model Publication No. Hei 3-39602 has disclosed an improved pilot valve. In the improved pilot valve, a stepped piston is movably attached to one of ends of a spool and is supported on a part of a valve body. The stepped piston is attached to the spool to form a pressure chamber and a damper chamber on the other end. The pressure chamber is caused to communicate with a secondary pressure side passage, and the damper chamber is caused to communicate with a tank line. In such a pilot valve, the damper effect of the damper chamber can prevent the above-mentioned hunting phenomenon of the spool.

In the improved pilot valve, however, the stepped piston and the like are required Consequently, there are drawbacks that a structure is complicated and the number of parts is also increased. Furthermore, the damper chamber is formed to be built in the other end of the spool. Therefore, it is hard to keep a large capacity for the damper chamber. Consequently, good damper effects cannot be obtained.

It is an object of the present invention to provide a pilot valve in which great damper effects can be obtained with a comparatively simple structure and a hunting phenomenon can fully be prevented.

SUMMARY OF THE INVENTION

The present invention provides a pilot valve comprising a valve body having a spring chamber and a spool hole communicating therewith, a push rod movably attached to the valve body, a spool movably attached to the spool hole, a spring bearing member movably provided in the spring chamber relatively to the valve body, a first spring member provided between the valve body and the spring bearing member for elastically biasing the push rod in a projecting position through the spring bearing member, a second spring member provided between the spring bearing member and the spool for elastically biasing the spool in a direction apart from the push rod, and an operation lever for pressing the push rod, the spool including a first spool portion having a small pressure receiving area of a pressure receiving part, a second spool portion having a large pressure receiving area of a pressure receiving part, and a notch provided between the first spool portion and the second spool portion, the pilot valve having a structure in which when the push rod is set in the projecting position, the first spool portion of the spool blocks communication of a primary pressure side passage with a secondary pressure side passage and the notch of the spool causes the secondary pressure side passage to communicate with a tank passage, and when the push rod is pressed by the operation lever, the spool is moved by action of the second spring member, the notch of the spool causes the primary pressure side passage to communicate with the secondary pressure side passage, and a pressure fluid flowing in the secondary pressure side passage acts on the pressure receiving parts of the first and second spool portions, wherein a fluid chamber is provided on an outside of one end of the spool, the fluid chamber communicating with a tank line through a throttle passage having a throttle portion.

According to the present invention, damper effects for the spool can be obtained with a simple structure in which the fluid chamber provided on the outside of one of the ends of the spool is connected to the tank line through the throttle passage. Furthermore, the fluid chamber is provided on the outside of the end of the spool. Therefore, the fluid chamber has a large volume and the fluid pressure of the fluid chamber acts on the whole area of one end face of the spool. Consequently, good damper effects can be obtained.

The present invention is characterized in that a drain passage extending from the spring chamber is provided on the valve body, the throttle passage is provided in the first spool portion of the spool, and the fluid chamber is caused to communicate with the drain passage.

According to the present invention, the throttle passage is provided in the first spool portion of the spool. The throttle passage is thus provided so that the throttle passage for causing the fluid chamber to communicate with the tank line can simply be provided.

The present invention is characterized in that the throttle passage extends from one of the ends of the spool in an axial direction through the first and second spool portions, and the fluid chamber is caused to communicate with the spring chamber.

According to the present invention, the throttle passage is provided from one of the ends of the spool through the first and second spools. The throttle passage is thus provided so that the fluid chamber can be caused to communicate with the tank line with a comparatively simple structure.

Furthermore, the present invention is characterized in that the spool hole is opened on one of ends of the valve body, a cover member for blocking an opening of the spool hole to form the fluid chamber is attached to the end of the valve body, a drain passage extending from the spring chamber is provided on the valve body and the cover member, the throttle passage is provided on a junction face of the valve body and the cover member, and the fluid chamber is caused to communicate with the drain passage.

According to the present invention, the fluid chamber is formed by attaching the cover member to one of the ends of the valve body, and the throttle passage is provided on the junction face of the valve body and the cover member. The fluid chamber and the throttle passage are thus provided so that the fluid chamber can be caused to communicate with the tank line considerably simply.

DESCRIPTION OF THE PREFERRED EMBODIMENTS

Figure 1:
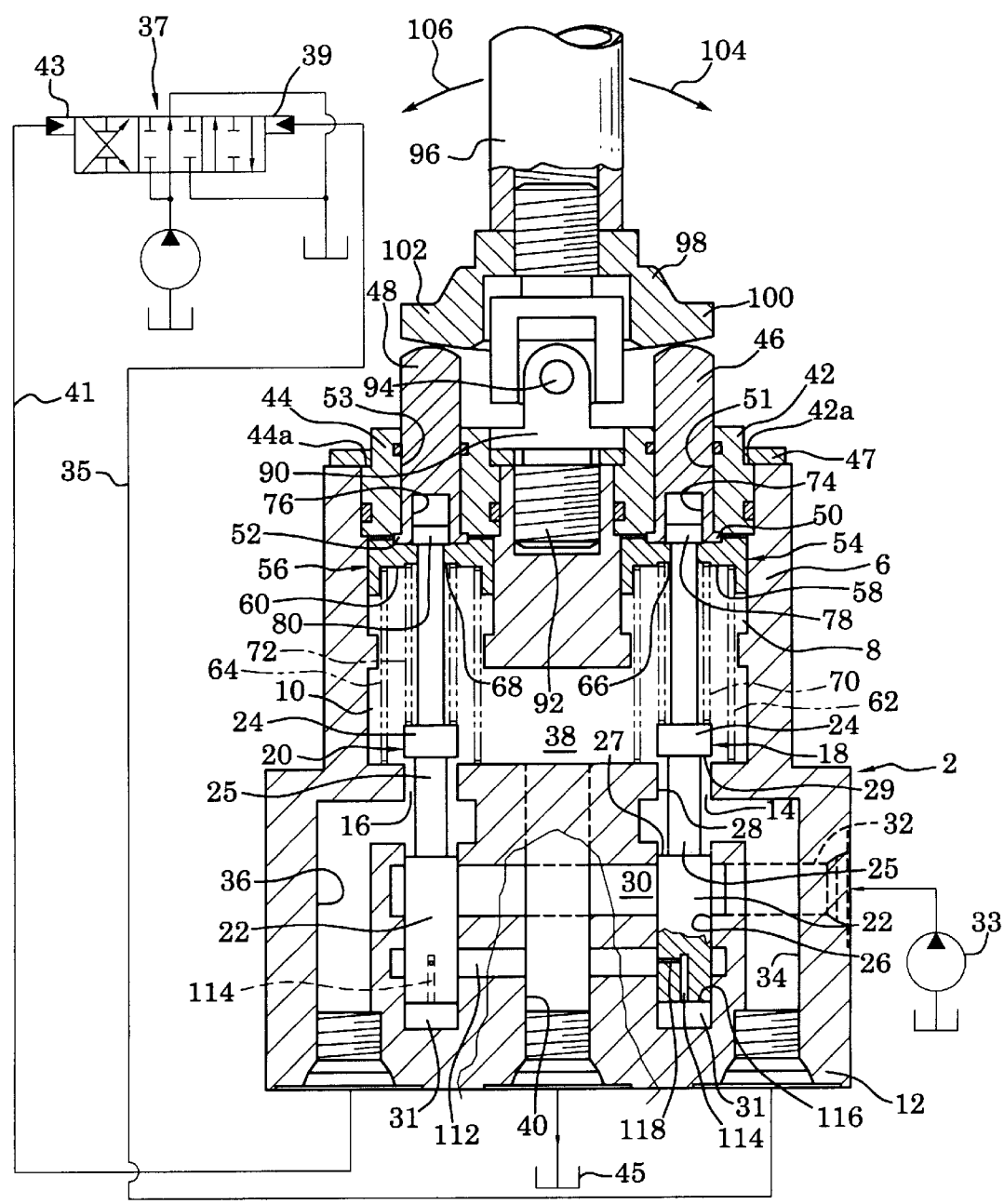
FIG. 1 is a sectional view showing a pilot valve according to a first embodiment of the present invention.

The present invention will further be described below with reference to the accompanying drawings. FIG. 1 is a sectional view showing a pilot valve according to a first embodiment of the present invention.

In FIG. 1, the pilot valve comprises a valve body 2. A pair of spring chambers 8 and 10 are provided at a constant interval in a lateral direction on an upper portion 6 of the valve body 2, and spool holes 14 and 16 are provided corresponding to the spring chambers 8 and 10 on a lower portion 12 of the valve body 2 in FIG. 1. One end of each of the spool holes 14 and 16 (a lower end in FIG. 1) is closed, and the other end thereof communicates with each of the spring chambers 8 and 10 and has an inside diameter smaller than an inside diameter of each of the spring chambers 8 and 10. Spools 18 and 20 are movably attached to the spool holes 14 and 16 in a vertical direction in FIG. 1. The spools 18 and 20 have substantially the same structures. One of the structures will be described below. A first spool portion 22 is provided on one of ends (lower end) of the spool 18 (20), a second spool portion 24 is provided in the middle of the spool 18 (20), and an annular notch 25 is formed between the first spool portion 22 and the second spool portion 24. As will be described later, an annular face 27 of the first spool portion 22 (an upper face in FIG. 1) formed by the notch 25 and an annular face 29 of the second spool portion 24 (a lower face in FIG. 1) function as pressure receiving parts on which a pressure fluid acts. In the present embodiment, an outside diameter of the second spool portion 24 is set greater than that of the first spool portion 22. Accordingly, a pressure receiving area of the pressure receiving part 29 of the second spool portion 24 is larger than that of the pressure receiving part 27 of the first spool portion 22. The spool hole 14 (16) includes a first hole portion 26 having an inside diameter corresponding to the outside diameter of the first spool portion 22, and a second hole portion 28 having an inside diameter corresponding to the outside diameter of the second spool portion 24. The inside diameter of the second hole portion 28 is set greater than that of the first hole portion 26. The first spool portion 22 of the spool 18 (20) is slidably supported on the first hole portion 26 of the spool hole 14 (16). Consequently, the spool 18 (20) is guided by the first hole portion 26 and moved in a vertical direction. Vertical movement of the spool 18 (20) causes the second spool portion 24 to be slidably received and guided by the second hole portion 28 of the spool hole 14 (16).

The spool 18 (20) is thus attached so that a fluid chamber 31 is formed on an outside of one of the ends of the spool 18 (20), that is, on a bottom of the first hole portion 26 of the spool hole 14 (16). A fluid in the fluid chamber 31 acts on the whole area of one of end faces of the spool 18 (20). The other end of each of the spools 18 and 20 extends upward to each of the spring chambers 8 and 10.

In the present embodiment, a first chamber 30 is provided as a pressure port in almost the central part of the lower portion 12 of the valve body 2. The first chamber 30 extends in a transverse direction in FIG. 1, and communicates with the first hole portion 26 of each of the spool holes 14 and 16. The first chamber 30 is connected to a hydraulic power source 33 such as an oil hydraulic pump through a primary pressure side passage 32 provided on the valve body 2. Pressure oil acting as a working fluid is supplied from the hydraulic power source 33 to the first chamber 30 through the primary pressure side passage 32. The primary pressure side passage 32 and the first chamber 30 form a pressure line to which the pressure oil is fed from the hydraulic power source 33. Secondary pressure side passages 34 and 36 to be switched and controlled by the spools 18 and 20 are provided in the lower portion 12 of the valve body 2. The secondary pressure side passage 34 is provided in relation to the spool hole 14, and is connected between the first and second hole portions 26 and 28 of the spool hole 14. The secondary pressure side passage 34 is connected to a pilot port 39 for spool control of a control valve 37 through a passage 35. The secondary pressure side passage 36 is provided in relation to the spool hole 16, and is connected between the first and second hole portions 26 and 28 of the spool hole 16. The secondary pressure side passage 36 is connected through a passage 41 to a reverse pilot port 43 for spool control of the control valve 37.

A second chamber 38 is provided as a tank port in almost the central part of the upper portion 6 of the valve body 2. The second chamber 38 extends in a lateral direction in FIG. 1 and communicates with the spring chambers 8 and 10. The second chamber 38 communicates with an oil tank 45 through a drain passage 40 formed in the lower portion 12 of the valve body 2. Oil in the second chamber 38 is returned to the oil tank 45 through the drain passage 40. The spring chambers 8 and 10, the second chamber 38 and the drain passage 40 form a tank line for returning oil from the secondary pressure side passages 34 and 36 to the oil tank 45.

Cylindrical plug members 42 and 44 are provided on upper ends of the spring chambers 8 and 10, respectively. Step portions 42a and 44a are provided on the plug members 42 and 44, respectively. A top cover 47 is caused to abut on the step potions 42a and 44a and is fixed to the valve body 2 with a screw (not shown). Thus, the plug members 42 and 44 are attached to the spring chambers 8 and 10, respectively. Rod holes are formed through the plug members 42 and 44. Push rods 46 and 48 are movably attached to the rod holes in a vertical direction in FIG. 1.

One end (an upper end) of each of the push rods 46 and 48 projects upward from each of the plug members 42 and 44. Each projecting end is formed hemispherically. The other ends (lower ends) of the push rods 46 and 48 project from the plug members 42 and 44 to the spring chambers 8 and 10, respectively. Flanges 50 and 52 projecting outward in a radial direction are provided on the projecting ends, respectively. Outside diameters of the flanges 50 and 52 are set greater than inside diameters of the rod holes. Accordingly, the flanges 50 and 52 abut on inner faces of the plug members 42 and 44 so that the push rods 46 and 48 are not moved upward beyond the projecting positions shown in FIG. 1.

Spring bearing members 54 and 56 are housed in the spring chambers 8 and 10 movably in a vertical direction in FIG. 1, respectively. The spring bearing members 54 and 56 are cylindrical. First spring bearing portions 58 and 60 are formed by first concave portions provided on lower end faces of the spring bearing members 54 and 56. First spring members 62 and 64 Are provided between the first spring bearing portions 58 and 60 and a part of the valve body 2 (wall portions defining the lower end faces of the spring chambers 8 and 10 in the present embodiment). The first spring members 62 and 64 are formed of a coil spring. The spring bearing members 54 and 56 are elastically biased upward toward the push rods 46 and 48 in FIG. 1. Consequently, the push rods 46 and 48 are elastically held in the projecting positions. The spring bearing members 54 and 56 are held in positions (shown in FIG. 1) where they abut on the flanges 50 and 52 of the push rods 46 and 48.

Each of the spring bearing members 54 and 56 has a second concave portion provided on an inside of the first concave portion. Second spring bearing portions 66 and 68 are formed by the second concave portions. Second spring members 70 and 72 are provided between the second spool portions 24 of the spools 18 and 20 and the second spring bearing portions 66 and 68, respectively. Each of the second spring members 70 and 72 is formed of a coil spring, and is provided on an inside of each of the first spring members 62 and 64. Housing concave portions 74 and 76 are formed on the other ends of the push rods 46 and 48 corresponding to the spools 18 and 20, respectively. The housing concave portions 74 and 76 extend inward from the other end faces of the push rods 46 and 48 in axial directions. The other ends of the spools 18 and 20 project upward into the housing concave portions 74 and 76 of the push rods 46 and 48 through holes formed on the spring bearing members 54 and 56 as shown in FIG. 1. The projecting ends are provided with head portions 78 and 80. The head portions 78 and 80 are housed in the housing concave portions 74 and 76 movably in a vertical direction.

With such a structure, the second spring members 70 and 72 act on the spools 18 and 20 so that they are elastically biased downward, that is, in a direction apart from the push rods 46 and 48 in FIG. 1. Consequently, the head portions 78 and 80 abut on the upper faces of the spring bearing members 54 and 56 so that the spools 18 and 20 are held in non-working positions shown in FIG. 1. When the spools 18 and 20 are set in the non-working positions, the first spool portion 22 is positioned on the first hole portion 26 of each of the spool holes 14 and 16 to block the communication of the first chamber 30 with the secondary pressure side passages 34 and 36. Consequently, the pressure oil in the first chamber 30 does not flow into the secondary pressure side passages 34 and 36. At this time, the second spool portions 24 of the spools 18 and 20 are positioned in the spring chambers 8 and 10, and the second chamber 38 communicates with the secondary pressure side passages 34 and 36 through the notches 26 of the spools 18 and 20 so that the pressure oil in the secondary pressure side passages 34 and 36 flows into the second chamber 38. While the spring bearing members 54 and 56 are movably attached to the spring chambers 8 and 10 in the present embodiment, they may be movably attached to the other ends of the spools 18 and 20.

A female screw portion is provided in the central part of the upper portion 6 of the valve body 2, that is, between the spring chambers 8 and 10. A male screw portion 92 of a mounting member 90 is fixed to the female screw portion. A pin 94 is attached to an upper end of the mounting member 90. A lower end of an operation lever 96 is coupled through the pin 94 pivotably in the lateral direction in FIG. 1. A press member 98 is fixed into the lower end of the operation lever 96. The press member 98 has working portions 100 and 102 corresponding to the push rods 46 and 48. In a state where the operation lever 96 is not manipulated, the push rods 46 and 48 are set m the projecting positions as shown in FIG. 1 and the upper ends of the push rods 46 and 48 come in contact with the working portions 100 and 102 of the press member 98 or abut thereon by comparatively weak force so that the operation lever 96 is held in a neutral position. When the operation lever 96 is turned from the neutral position in a direction shown by an arrow 104 (or 106), the working portion 100 (or 102) of the press member 98 presses the posh rod 46 (or 48). Consequently, the spools 18 and 20 are moved as will be described later.

In the present embodiment, the lower portion 12 of the valve body 2 has a third chamber 112 provided below the first chamber 30. The third chamber 112 communicates with the drain passage 40. The fluid chamber 31 provided on the bottom of the first hole 26 of each of the spool holes 14 and 16 communicates with the third chamber 112 through a passage 114 formed in the first spool portion 22 of each of the spools 18 and 20. The passage 114 is formed by a first hole 116 extending from one end of each of the spools 18 and 20 in an axial direction, and a second hole 118 extending from the first hole 116 to an outer peripheral face in a radial direction, The second hole 118 has a small inside diameter, and functions as a throttle portion. By such a structure, the passage 114 of each of the spools 18 and 20 and the third chamber 112 form a throttle passage which causes the fluid chamber 31 to communicate with the drain passage 40.

Figure 2:
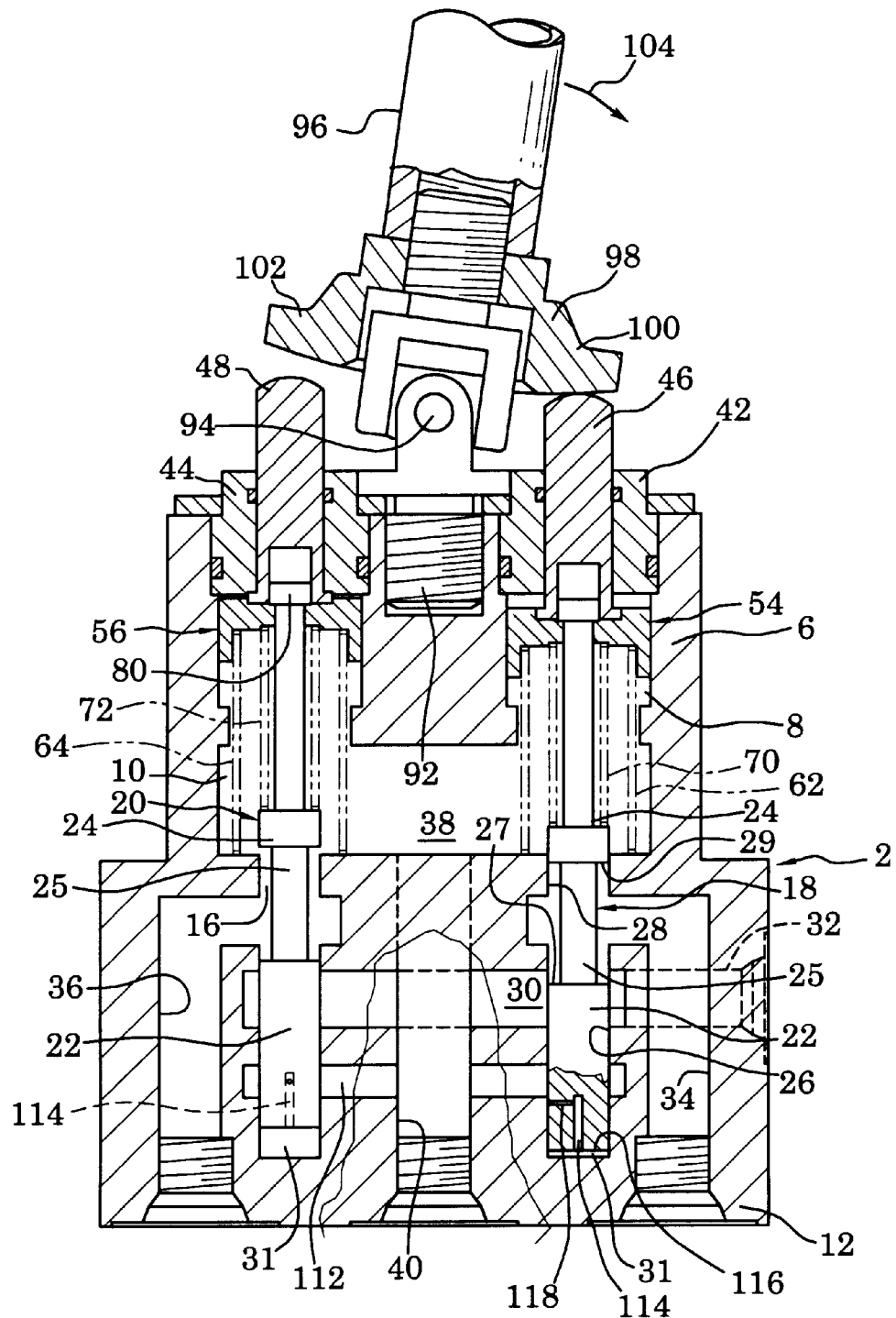
FIG. 2 is a sectional view showing the pilot valve of FIG. 1 in a state in which an operation lever is manipulated.

With reference to FIGS. 1 and 2, the function and effect of the pilot valve will be described below. When the operation lever 96 is set in a neutral position, the push rods 46 and 48 are held in the projecting positions by the action of the first spring members 62 and 64 and the spools 18 and 20 are held in the non-working positions by the second spring members 70 and 72 as described above. Accordingly, the communication of the first chamber 30 with the secondary pressure side passages 34 and 36 is blocked by the first spool portion 22 of each of the spools 18 and 20. However, the second chamber 38 is caused to communicate with the secondary pressure side passages 34 and 36 through the notches 25 of the spools 18 and 20, and the pilot ports 39 and 43 for spool control of the control valve 37 are caused to communicate with the oil tank 45 through the secondary pressure side passages 34 and 36, the second chamber 38 and the drain passage 40 so that the spool of the control valve 37 is held in a neutral position.

When the operation lever 96 is turned leftward from the neutral position in the direction shown by the arrow 104, the pilot valve is brought into a state shown in FIG. 2. More specifically, when the operation lever 96 is manipulated, the working portion 100 of the press member 98 presses the push rod 46 so that the push rod 46 and the spring bearing member 54 are moved downward against the elastic force of the first spring member 62. Consequently, the spool 18 is moved downward by the action of the second spring member 70 together with the movement of the spring bearing member 54. At this time, the oil in the spring chamber 8 flows to an outside of the spring bearing member 54 through the hole of the spring bearing member 54.

When the spool 18 is thus moved downward, the notch 25 of the spool 18 causes the first chamber 30 to communicate with the secondary pressure side passage 34. Accordingly, the pressure oil is fed from the hydraulic power source 33 to the pilot port 39 for spool control of the control valve 37 through the primary pressure side passage 32, the first chamber 30 and the secondary pressure side passage 34. The spool of the control valve 37 is moved leftward from the neutral position by the pressure oil fed from the hydraulic power source 33 in FIG. 2. In the pilot valve, the fluid chamber 31 communicates with the drain passage 40 through the third chamber 112 as described above. Furthermore, the outside diameter of the first spool portion 22 is set smaller than that of the second spool portion 24, and the pressure receiving area of the first spool portion 22 is smaller than that of the second spool portion 24. Therefore, the pressure oil fed to the secondary pressure side passage 34 acts in a direction for pushing up the spool 18 by force generated by a difference in a pressure receiving area. Accordingly, the spool 18 is held in a position where operating force generated by the operation lever 96, that is, push-down force generated by the second spring member 70 is balanced with the push-up force generated by the pressure oil in the secondary pressure side passage 34.

In such a pilot valve, when the spool 18 (20) is moved downward to feed the pressure oil from the primary pressure side passage 32 to the secondary pressure side passage 34 (36), a pressure of the secondary pressure side passage 34 (36) is raised so that the spool 18 (20) is moved upward. When such movement causes the secondary pressure side passage 34 (36) to communicate with the second spring chamber 8 (10), the pressure oil fed from the secondary pressure side passage 34 (36) flows into the spring chamber 8 (10) so that the pressure of the secondary pressure side passage 34 (36) is dropped to move the spool 18 (20) downward. In such a control state, there is a possibility that vertical vibration of the spool 18 (20), that is, a so-called hunting phenomenon might be caused. In the same control state, however, the fluid chamber 31 and the throttle passage 114 are operated in the following manner More specifically, when the pressure of the secondary pressure side passage 34 (36) is dropped to move the spool 18 (20) downward by the action of the second spring member 70 (72), the oil in the fluid chamber 31 acts on one end face of the spool 18 (20) and a part of the oil is discharged into the third chamber 112 through the throttle passage 114. An amount of the oil to be discharged into the third chamber 112 is limited by a throttle portion of the throttle passage 114 (the second hole 118 in the present embodiment). The suction and discharge of the pressure oil is performed by the vertical movement of the spool is (20) through throttling so that a differential pressure is generated in the fluid chamber 31. Accordingly, the fluid chamber 31 and the throttle passage 114 act as damper means for controlling rapid vertical movement of the spool 18 (20). Consequently, the hunting phenomenon can be prevented from being caused.

Since the present embodiment has the above-mentioned structure, it further has the following features. With a simple structure in which the bottom of the first hole portion 26 of the spool hole 14 (16) is utilized as the fluid chamber 31 and the throttle passage 114 communicating with the third chamber 112 is provided on the spool 18 (20), the spool 18 (20) can have damper effects. Since the bottom of the first hole portion 26 is utilized, the fluid chamber 31 cam keep a sufficient capacity. Furthermore, the oil pressure of the fluid chamber 31 acts on the whole region of the end face of the spool 18 (20). Therefore, sufficient damper effects can be obtained for the spool 18 (20).

Figure 3:
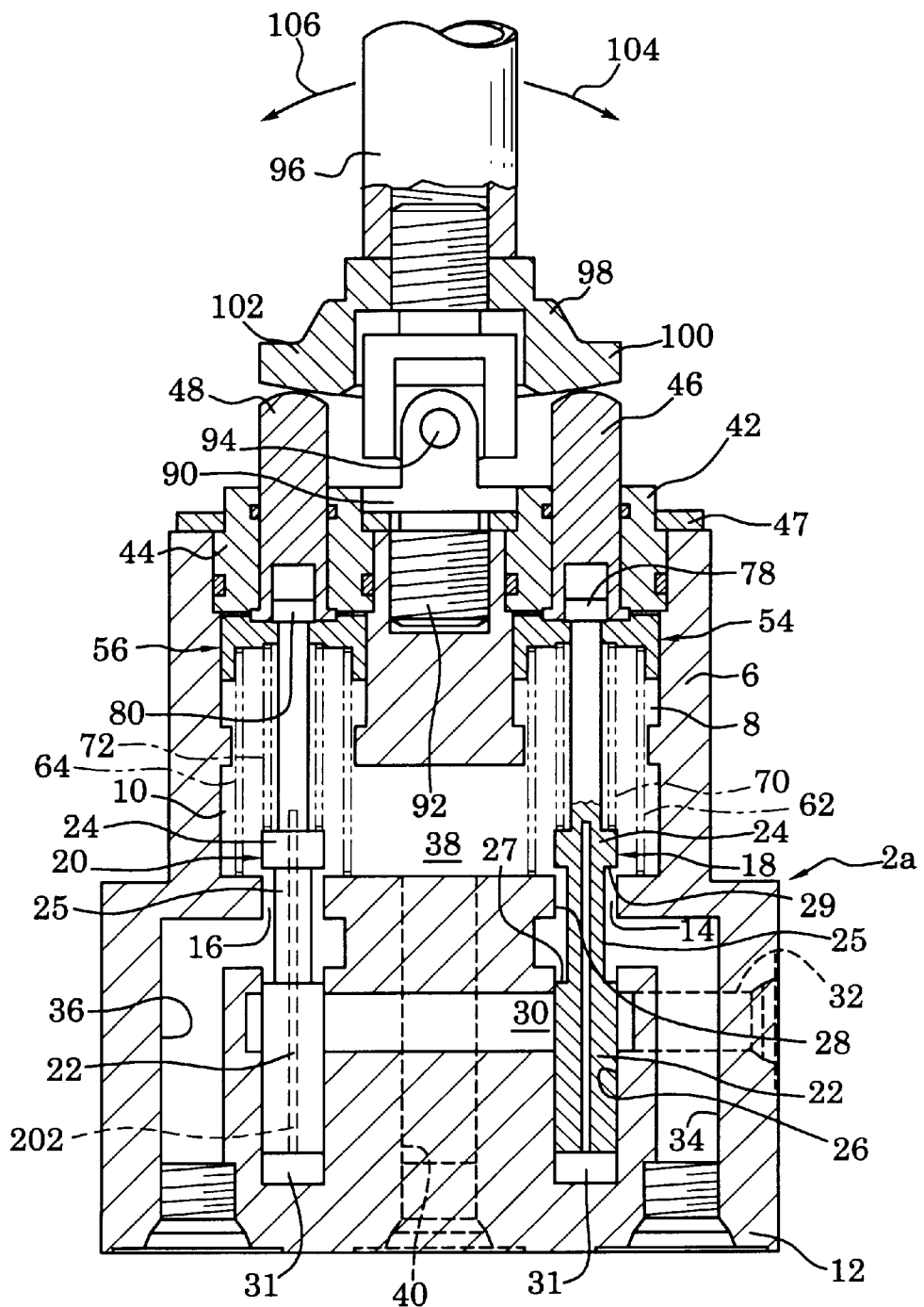
FIG. 3 is a sectional view showing a pilot valve according to a second embodiment of the present invention.

FIG. 3 is a sectional view showing a pilot valve according to a second embodiment of the present invention. In the second embodiment, a tank line and a throttle passage communicating therewith are modified. In the following explanation, members which are substantially identical to those in the first embodiment have the identical reference numerals, and their description will be omitted.

In FIG. 3, a drain passage 40 extending upward is formed in a lower portion 12 of a valve body 2a and communicates with a second chamber 38 in the second embodiment. A throttle passage 202 is provided on each of spools 18 and 20. One end of the throttle passage 202 is opened on one end face of each of the spools 18 and 20, and communicates with a fluid chamber 31 provided on a bottom of a first hole portion 26 of each of spool holes 14 and 16. The throttle passage 202 extends upward through first and second spool portions 22 and 24 in an axial direction of each of the spools 18 and 20. The other end of the throttle passage 202 is opened on each of spring chambers 8 and 10. In the present embodiment, the other end of the throttle passage 202 which communicates with each of the spring chambers 8 and 10 has a small inside diameter, and functions as a throttle portion. The throttle portion may be provided on one end of the throttle passage 202 communicating with the fluid chamber 81 in place of the above-mentioned other end. With such a structure, a throttle member having the throttle portion may be attached to the throttle passage 202. Other structures in the second embodiment are substantially identical to those in the first embodiment.

In the second embodiment, a basic structure including the fluid chamber 31 and the throttle passage 202 is substantially identical to that of the first embodiment. Therefore, the same function and effect as in the first embodiment can be obtained.

Figure 4:
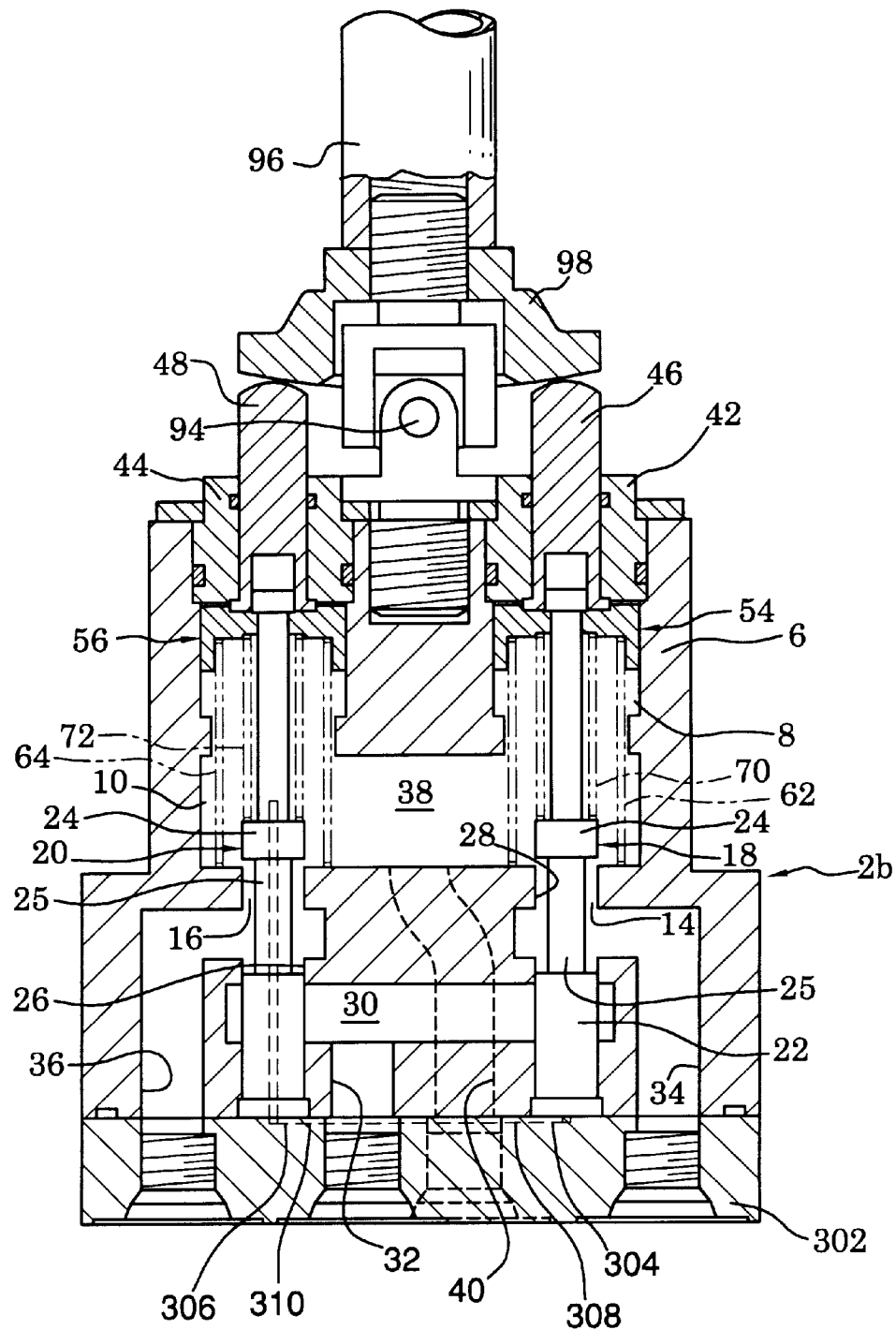
FIG. 4 is a sectional view showing a pilot valve according to a third embodiment of the present invention.

FIG. 4 is a sectional view showing a pilot valve according to a third embodiment of the present invention In the third embodiment, a valve body and a throttle passage are modified.

In FIG. 4, a cover member 302 is fixed to one of ends of a valve body 2b with a screw (not shown). Spool holes 14 and 16 having spools 18 and 20 attached thereto are formed through a lower portion 12 of the valve body 2b. The cover member 302 is attached to the end (lower end) of the valve body 2b as described above. Consequently, one end of each of the spool holes 14 and 16 is blocked and a bottom of a first hole potion 26 of each of the spool holes 14 and 16 which are closed by the cover member 302, functions as a fluid chamber 31. Since the cover member 302 is thus attached, a primary pressure side passage 32 communicating with a first chamber 30, secondary pressure side passages 34 and 36 communicating with a pilot port for spool control of a control valve, and a drain passage 40 communicating with a second chamber 38 pass through the lower portion 12 of the valve body 2b and extends through the cover member 302 as shown in FIG. 4.

A throttle passage is provided on a junction face of an end face (lower end face) of the valve body 2b and an inner face of the cover member 302. In the present embodiment, slots 304 and 306 are formed on the inner face of the cover member 302 corresponding to the spool holes 14 and 16, and throttle members 308 and 310 for reducing sections of the slots 304 and 306 are provided on the slots 304 and 306. The slot 304 forms a bottom of the spool hole 14, that is, a throttle passage for causing the fluid chamber 31 to communicate with the drain passage 40, and the throttle member 308 functions as a throttle portion for limiting an amount of oil flowing therein. The slot 806 forms a bottom of the spool hole 16, that is, a throttle passage for causing the fluid chamber 31 to communicate with the drain passage 40, and the throttle member 310 functions as a throttle portion for limiting an amount of oil flowing therein. The slots 308 and 310 can be provided on the end face of the valve body 2b in place of the inner face of the cover member 302, or both the inner face of the cover member 302 and the end face of the valve body 2b. Other structures in the third embodiment are substantially identical to those in the first embodiment.

Also in the third embodiment, a basic structure including the fluid chamber 31 and the throttle passage is substantially identical to that in the first embodiment. Therefore, it is possible to obtain effects which are substantially identical to those in the first embodiment. In the third embodiment, furthermore, the throttle passage is provided on the junction face of the valve body 2b and the cover member 302. Therefore, the throttle passage can be formed simply and easily, and a manufacturing cost can also be reduced.

While the pilot valve according to various embodiments of the present invention has been described above, the present invention is not restricted to the above-mentioned embodiments. Various changes and modifications may be made without departing from the scope of the invention.

While the present invention has been applied to the pilot valve having the form in which two spools are movably provided on the valve body in the above-mentioned embodiments, for example, it can also be applied to a pilot valve having a form in which one or four spools are movably provided.

What is claimed is:

1. A pilot valve comprising:
a valve body having a spring chamber and a spool hole communicating therewith;
a push rod movably attached to the valve body;
a fluid chamber, at least a part of which is formed in the valve body;
a spool movably attached to the spool hole, one end surface of the spool forming a portion of an interior surface of the fluid chamber;
a spring bearing member movably provided in the spring chamber relatively to the valve body;
a first spring member provided between the valve body and the spring bearing member for elastically biasing the push rod in a projecting position through the spring bearing member;
a second spring member provided between the spring bearing member and the spool for elastically biasing the spool in a direction apart from the push rod; and
an operation lever for pressing the push rod,
the spool including:
a first spool portion having a small pressure receiving area of a pressure receiving part;
a second spool portion having a large pressure receiving area of a pressure receiving part; and
a notch provided between the first spool portion and the second spool portion,
the pilot valve having a structure in which when the push rod is set in the projecting position, the first spool portion of the spool blocks communication of a primary pressure side passage with a secondary pressure side passage and the notch of the spool causes the secondary pressure side passage to communicate with a tank passage, and when the push rod is pressed by the operation lever, the spool is moved by action of the second spring member, the notch of the spool causes the primary pressure side passage to communicate with the secondary pressure side passage, and a pressure fluid flowing in the secondary pressure side passage acts on the pressure receiving parts of the first and second spool portions,
wherein the fluid chamber is provided on an outside of one end of the spool, the fluid chamber communicating with a tank line through a throttle passage having a throttle portion.

2. A pilot valve comprising:
a valve body having a spring chamber and a spool hole communicating therewith;
a push rod movably attached to the valve body;
a spool movably attached to the spool hole;
a spring bearing member movably provided in the spring chamber relatively to the valve body;
a first spring member provided between the valve body and the spring bearing member for elastically biasing the push rod in a projecting position through the spring bearing member;

a second spring member provided between the spring bearing member and the spool for elastically biasing the spool in a direction apart from the push rod; and an operation lever for pressing the push rod, the spool including:

a first spool portion having a small pressure receiving area of a pressure receiving part;

a second spool portion having a large pressure receiving area of a pressure receiving part; and a notch provided between the first spool portion and the second spool portion, the pilot valve having a structure in which when the push rod is set in the projecting position, the first spool portion of the spool blocks communication of a primary pressure side passage with a secondary pressure side passage and the notch of the spool causes the secondary pressure side passage to communicate with a tank passage, and when the push rod is pressed by the operation lever the spool is moved by action of the second spring member, the notch of the spool causes the primary pressure side passage to communicate with the secondary pressure side passage, and a pressure fluid flowing in the secondary pressure side passage acts on the pressure receiving parts of the first and second spool portions, wherein a fluid chamber is provided on an outside of one end of the spool, the fluid chamber communicating with a tank line through a throttle passage having a throttle portion and a drain passage extending from the spring chamber is provided on the valve body, the throttle passage is provided in the first spool portion of the spool, and the fluid chamber is caused to communicate with the drain passage.

3. A pilot valve comprising:

a valve body having a spring chamber and a spool hole communicating therewith;

a push rod movably attached to the valve body;

a spool movably attached to the spool hole;

a spring bearing member movably provided in the spring chamber relatively to the valve body;

a first spring member provided between the valve body and the spring bearing member for elastically biasing the push rod in a projecting position through the spring bearing member;

a second spring member provided between the spring bearing member and the spool for elastically biasing the spool in a direction apart from the push rod; and an operation lever for pressing the push rod, the spool including:

a first spool portion having a small pressure receiving area of a pressure receiving part;

a second spool portion having a large pressure receiving area of a pressure receiving part; and a notch provided between the first spool portion and the second spool portion, the pilot valve having a structure in which when the push rod is set in the projecting position, the first spool portion of the spool blocks communication of a primary pressure side passage with a secondary pressure side passage and the notch of the spool causes the secondary pressure side passage to communicate with a tank passage, and when the push rod is pressed by the operation lever, the spool is moved by action of the second spring member, the notch of the spool causes the primary pressure side passage to communicate with the secondary pressure side passage, and a pressure fluid flowing in the secondary pressure side passage acts on the pressure receiving parts of the first and second spool portions, wherein a fluid chamber is provided on an outside of one end of the spool, the fluid chamber communicating with a tank line through a throttle passage having a throttle portion and the throttle passage extends from one of the ends of the spool in an axial direction through the first and second spool portions, and the fluid chamber is caused to communicate with the spring chamber.

4. A pilot valve comprising:

a valve body having a spring chamber and a spool hole communicating therewith;

a push rod movably attached to the valve body;

a spool movably attached to the spool hole;

a spring bearing member movably provided in the spring chamber relatively to the valve body;

a first spring member provided between the valve body and the spring bearing member for elastically biasing the push rod in a projecting position through the spring bearing member;

a second spring member provided between the spring bearing member and the spool for elastically biasing the spool in a direction apart from the push rod; and an operation lever for pressing the push rod, the spool including:

a first spool portion having a small pressure receiving area of a pressure receiving part;

a second spool portion having a large pressure receiving area of a pressure receiving part; and a notch provided between the first spool portion and the second spool portion, the pilot valve having a structure in which when the push rod is set in the protecting position, the first spool portion of the spool blocks communication of a primary pressure side passage with a secondary pressure side passage and the notch of the spool causes the secondary pressure side passage to communicate with a tank passage, and when the push rod is pressed by the operation lever, the spool is moved by action of the second spring member, the notch of the spool causes the primary pressure side passage to communicate with the secondary pressure side passage, and a pressure fluid flowing in the secondary pressure side passage acts on the pressure receiving parts of the first and second spool portions, wherein a fluid chamber is provided on an outside of one end of the spool, the fluid chamber communicating with a tank line through a throttle passage having a throttle portion and the spool hole is opened on one end of the valve body, a cover member for blocking an opening of the spool hole to form the fluid chamber is attached to the end of the valve body, a drain passage extending from the spring chamber is provided on the valve body and the cover member, the throttle passage is provided on a junction face of the valve body and the cover member, and the fluid chamber is caused to communicate with the drain passage.

\* \* \* \* \*